(12) United States Patent
DeCollibus et al.

(10) Patent No.: US 7,594,524 B2
(45) Date of Patent: Sep. 29, 2009

(54) CONCRETE WASH OUT AND SLURRY CAPTURE METHOD AND SYSTEM

(75) Inventors: Tullio J. DeCollibus, Laguna Niguel, CA (US); Joseph J. Manno, La Jolla, CA (US)

(73) Assignee: SRS Global Solutions, Las Vegas, NV (US)

( * ) Notice: Subject to any disclaimer, the term of this patent is extended or adjusted under 35 U.S.C. 154(b) by 673 days.

(21) Appl. No.: 10/537,140

(22) PCT Filed: Mar. 16, 2005

(86) PCT No.: PCT/US2005/008736

§ 371 (c)(1),
(2), (4) Date: Jun. 1, 2005

(87) PCT Pub. No.: WO2006/068651

PCT Pub. Date: Jun. 29, 2006

(65) Prior Publication Data

US 2007/0002677 A1    Jan. 4, 2007

Related U.S. Application Data

(60) Provisional application No. 60/638,325, filed on Dec. 21, 2004.

(51) Int. Cl.
*B65B 1/04* (2006.01)
*B08B 3/04* (2006.01)
(52) U.S. Cl. .............. 141/86; 141/1; 141/65; 141/89; 141/91; 134/104.4; 134/111

(58) Field of Classification Search ............ 141/1, 141/8, 11, 65, 85, 86, 89, 91; 209/420, 421; 134/104.4, 111, 168 R
See application file for complete search history.

(56) References Cited

U.S. PATENT DOCUMENTS

| 5,487,228 | A | * | 1/1996 | Marazzo et al. ............. 37/317 |
| 5,685,978 | A | | 11/1997 | Petrick et al. |
| 5,927,461 | A | * | 7/1999 | Jamieson ............. 193/6 |
| 6,155,277 | A | | 12/2000 | Barry |
| 6,354,439 | B1 | * | 3/2002 | Arbore ............. 209/421 |
| 7,117,995 | B2 | * | 10/2006 | Connard, III ............. 209/421 |
| 2004/0105741 | A1 | | 6/2004 | Inglese |
| 2004/0159595 | A1 | | 8/2004 | Connard |
| 2006/0000490 | A1 | | 1/2006 | Barragan |

FOREIGN PATENT DOCUMENTS

| DE | 9216144 U1 | 2/1993 |
| WO | WO2005/067671 | 7/2005 |

* cited by examiner

*Primary Examiner*—Timothy L Maust
(74) *Attorney, Agent, or Firm*—Greenberg Traurig (57) ABSTRACT

A slurry capture system and kit, and methods of using them, are disclosed for facilitating the recovery of a concrete residue, such as from a chute of a cement mixer truck. The system includes a collector for attaching to the chute of the cement mixer truck and for collecting the concrete residue therefrom. The system further includes a container for storing the collected residue and a conduit in fluid communication between the collector and the container for transferring the residue collected in the collector to the container for subsequent disposal.

11 Claims, 5 Drawing Sheets

CONCRETE WASH OUT AND SLURRY CAPTURE METHOD AND SYSTEM

RELATED APPLICATION

This application claims priority to U.S. provisional patent application, entitled CONCRETE SLURRY CAPTURE METHOD AND SYSTEM, Application No. 60/638,325, deposited on Dec. 22, 2004.

FIELD OF THE INVENTION

The present invention relates in general to a method and system for the capture of slurry concrete and aggregates. In particular, the invention relates to a method and system for the recovery of a concrete slurry and aggregates exiting a chute of a cement mixing truck.

BACKGROUND ART

There is no admission that the background art disclosed in this section legally constitutes prior art.

Concrete is frequently delivered to a construction site in a cement mixer truck. The truck may have a rotating drum in which the components of concrete are mixed in route to the site. The concrete is formed by mixing cement and various aggregates, such as sand, with water to form a concrete mixture. At the site, the concrete is poured from the drum onto a surface generally through a chute, which is typically part of the cement mixer truck. Once the delivery of the concrete is complete, the chute and other components may be coated with residual concrete material. This residual concrete material should, in many instances, be cleaned off of the chute and any other components of the cement mixer truck in order to prevent hardening of the concrete in place on the components.

In cleaning the chute and other components, water, for example, may be generally sprayed onto the chute to mix with the concrete and generally become suspended therein, forming a concrete slurry. The runoff of the cleaning process may be environmentally controlled for at least some applications. For example, it may be desirable to prevent or limit the runoff of the concrete slurry and aggregates onto the ground, as the runoff materials may constitute a serious environmental hazard. Further, the runoff materials may constitute lost resources to the concrete provider.

There have been a variety of different types and kinds of systems and methods for recovering concrete. For example, reference may be made to U.S. Pat. No. 6,782,925 titled "CONCRETE RECOVERY METHOD AND SYSTEM," issued Aug. 31, 2004.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

It will be readily understood that the components of the embodiments as generally described and illustrated in the drawings herein, could be arranged and designed in a wide variety of different configurations. Thus, the following more detailed description of the embodiments of the system, components and method of the present inventions, as represented in the drawings, is not intended to limit the scope of the invention, as claimed, but is merely representative of the embodiment of the invention.

According to certain embodiments of the present invention, a slurry capture system and kit facilitates the recovery of a concrete slurry runoff, such as from a chute of a cement mixer truck. The system includes a collector for attaching to the chute of the cement mixer truck and for collecting the concrete slurry and aggregates therefrom. The system further includes a container for storing the collected concrete slurry and a conduit in fluid communication between the collector and the container for transferring the concrete slurry collected in the collector to the container for subsequent concrete recovery.

According to other embodiments of the present invention, there is provided a method for recovering concrete from a cement mixer. The method includes collecting the concrete slurry from the chute into the collector and discharging the concrete slurry from the collector into the conduit. The method further includes discharging the concrete slurry from the conduit into the container for subsequent concrete recovery.

There is provided yet another embodiment of a method for recovering concrete from a cement mixer. The method includes using a chute scraper tool to motivate the concrete slurry having entrained aggregates into the chute extension. The concrete slurry then passes through a filter, thereby filtering the aggregate debris from the concrete slurry before flowing to the conduit and the container. The aggregates may then be placed in an aggregate storage and recycle system for subsequent recycling or use.

According to yet another embodiment of the present invention, there is provided a method for recovering residual concrete from the ground surrounding a cement mixer. The method includes using a vacuum system to suction the residual concrete and transferring the suctioned concrete into the container for subsequent concrete recovery.

Figure 1:
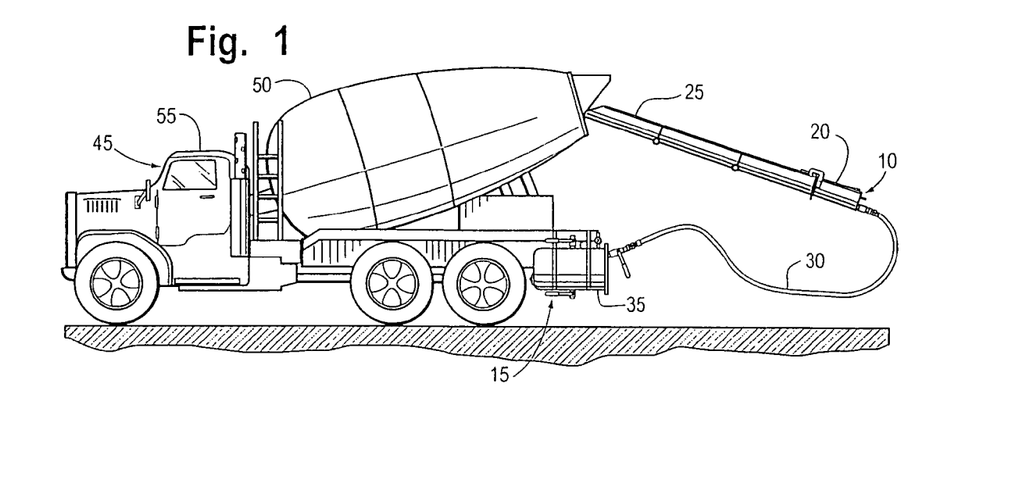
FIG. 1 is a side elevational view of a slurry capture system of an embodiment of the present invention, illustrating a portion of the system mounted on a cement mixer truck.

Referring now to the drawings and, more particularly to FIG. 1 thereof, there is shown a slurry capture system shown generally at 10, which is constructed in accordance with an embodiment of the invention. The slurry capture system 10 may be part of a slurry recovery system shown generally at 15. The slurry recovery system which may be similar to the one more fully described in U.S. Pat. No. 6,782,925. The slurry capture system 10 and slurry recovery system 15 may be mounted on a cement mixer truck shown generally at 45.

The cement mixer truck 45 may be a conventional type and may include a rotating drum 50 for containing and mixing cement and other aggregates for formation of a concrete mixture. The cement mixer truck 45 may further include a driver cab 55 where a driver or other user may operate various components of the cement mixer truck 45. Other components (not shown) of the cement mixer truck 45 may be operated from other locations. The cement mixer truck 45 may further include a collector 20 attached to the exit end of a chute 25. The chute 25 may be attached in fluid communication with the discharge of the rotating drum 50 of the cement mixer truck 45 so that a concrete mixture exiting the discharge of the rotating drum 50 may flow down the inclined chute 25 and ultimately onto a point of placement (not shown) for the concrete mixture.

Figure 2:
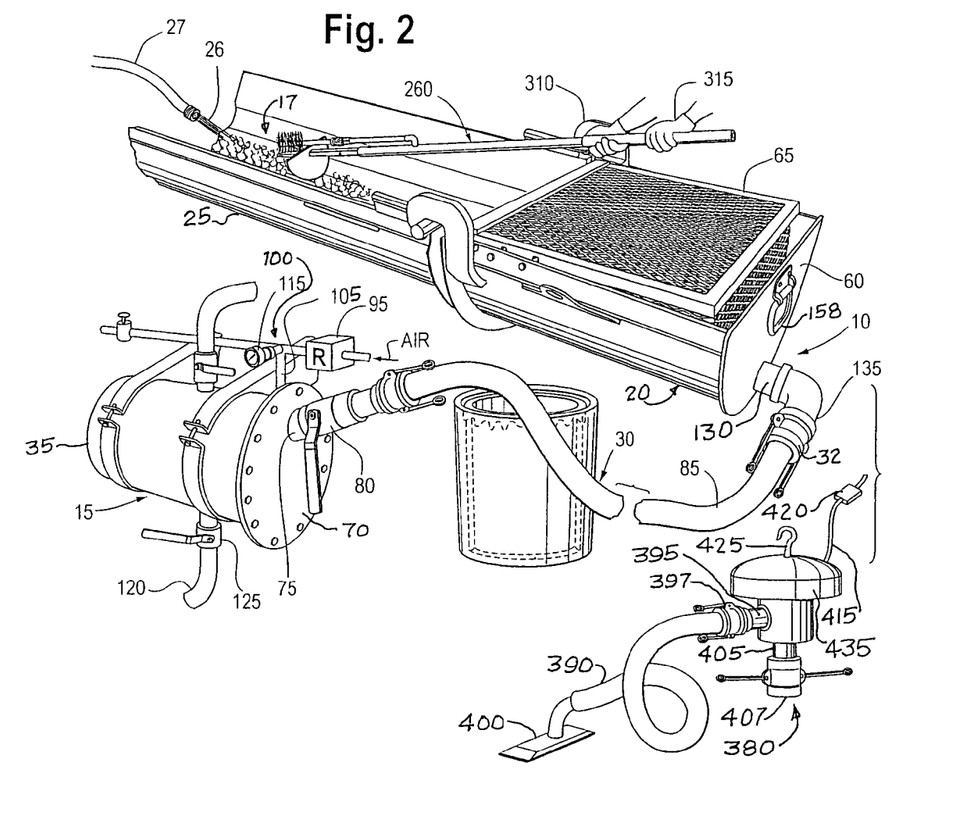
FIG. 2 is an enlarged scale pictorial fragmentary view of the slurry capture system and kit of FIG. 1.

The collector 20 may be removably or pivotally attached to the chute 25 for collecting the concrete slurry runoff (not shown) and prefiltered aggregates that may flow down the chute 25 when the chute 25 is washed by an operator partially shown at 315 (FIG. 2). Prefiltered residual concrete and aggregates in the context of this disclosure implies concrete aggregates that may be disposed on the cement mixer truck or on the ground and that may become entrained in the concrete slurry and not filtered or removed therefrom.

A slurry runoff conduit 30 may be disposed in fluid communication between the collector 20 and a container 35 which may be in the form of a pressurized tank 70 (FIG. 2) as fully described in U.S. Pat. No. 6,782,925 and may form part of the slurry recovery system shown generally at 15. It should be understood that the container 35 is not limited to being a pressurized tank as other types of containers may be used and may include a bucket (not shown), a plastic bag (not shown) or other.

The collector 20 may be disposed at the discharge end of the chute 25 above the container 35 so that gravity may be used to cause the concrete slurry runoff (not shown) to flow down the slurry runoff conduit 30 into the container 35 thereby entirely eliminating or reducing the requirement for a pump. Eliminating a pump may be desirable since the elimination of a pump may lower the overall cost and complexity of the slurry capture system 10.

In operation and with continued reference to FIG. 1, the cement mixer truck 45 dispenses concrete (not shown) from the discharge end 52 of the rotating drum 50 and down the chute 25 onto the point of placement (not shown), such as a sidewalk or a driveway. When the operator (partially shown at 315 (FIG. 2) has completed dispensing concrete from the cement mixer truck 45, the operator or other user may be required to clean the chute 25 of the cement mixer truck 45 before the concrete hardens thereon. The operator may apply a liquid, such as water or other suitable liquids, onto the chute 25 thereby forming a concrete slurry. The concrete slurry may include entrained aggregates such as gravel or small rocks.

As the concrete slurry is formed by spraying a liquid onto the chute 25 having concrete thereon, the collector 20 may receive and collect the concrete slurry and discharge the concrete slurry into the slurry runoff conduit 30. The concrete slurry then may flow down the slurry runoff conduit 30 via the force of gravity into the container 35 where it may be stored for subsequent concrete recovery or disposal. In one embodiment of the present method, concrete recovery may be performed using the system and method as more fully described in U.S. Pat. No. 6,782,925. It should be understood that other concrete recovery systems and methods may also be used.

Considering now the slurry capture system shown generally at 10 in more detail and with reference to FIG. 2, the slurry capture system 10 may or may not include the slurry recovery system shown generally at 15. The slurry recovery system 15 may be connected in fluid communication with the slurry capture system 10 via the slurry runoff conduit 30 which may be in the form of a hose 85 such as a flexible plastic hose. The slurry runoff conduit 30 may also be in the form of a pipe or other fluid transfer apparatus as is well known in the art. In this way, the concrete slurry runoff (not shown) exiting the discharge end of the chute 25 flows into the slurry recovery system 15 and concrete may then be recovered therefrom.

With continued reference to FIG. 2, the collector, shown generally at 20, may include or be in the form of a chute extension 60 having a wire box 65 disposed therein. The collector 20 may be adapted to releasably or pivotally attach to the discharge end of the chute 25 of the cement mixer truck 45. The chute extension 60 may generally be trough shaped and may have an open top and a handle 158 pivotally attached to an end wall. A cavity or hollow interior of the chute extension 60 may be adapted to removably receive a filter, such as the wire box 65.

The wire box 65 may be formed of a suitable mesh material where the mesh may have spaces formed therein sized to filter out aggregate from the concrete slurry, such as rocks or other debris flowing from the chute 25 when the wire box 65 may be placed within the cavity of the chute extension 60. It should be understood that the invention is not limited to the use of the wire box or other filter. Other types and kinds of filters and filtering apparatus may also be used, including, but not limited to, two-dimensional filtering systems such as a flat wire screen. The filter box 65, when used, can collect clean aggregate which may be re-used for other purposes.

A slurry runoff conduit 30 in the form of a hose 85 may be releasably attached via a quick disconnect hose coupling 32 to a discharge end of the chute extension 60. The discharge end of the chute extension 60 is defined as being on the opposite end of the chute extension 60 from the chute 25. Preferably, the quick disconnect hose coupling 32 would include a valve (not shown) that would either automatically or manually close when the hose 85 were disconnected therefrom. The hose 85 at one end thereof, may be connected via the quick disconnect hose coupling 32 in fluid communication with the cavity formed within the chute extension 60 via an elbow 135. The opposite end of the hose 85 may be connected to a container 35, such as a pressurization tank. In this way, the concrete slurry, flowing through the chute extension 60 and through the wire box 65 disposed within the cavity of the chute extension 60, may flow through the hose 85 and into the pressurization tank 35 for recycling back into the cement mixer truck or other desired location.

In operation, the open top chute extension 60 may be pivotally attached to the discharge end of the chute 25 of the cement mixer truck 45 (FIG. 1). The wire box 65 may be secured within the cavity of the chute extension 60. The hose 85 at one end thereof, may be connected in fluid communication to the discharge end of the chute extension 60 via the quick disconnect hose coupling 32 and elbow 135, and the opposite end of the hose 85 may be connected in fluid communication to the pressurization tank 35. Thus, when an operator partially shown at 315 cleans the chute 25 with water 26 under pressure, or another fluid, from a hose 27, the water then washes out the residual concrete shown generally at 17 (FIG. 2) in the chute 25. The concrete slurry may flow downwardly toward the discharge end of the chute 25 and into the cavity of the chute extension 60. Since the chute extension 60 may have the wire box 65 placed therein, the mesh of the wire box 65 may perform a filtering function and may prevent aggregates such as rocks or other debris present in the concrete slurry from passing through the chute extension 60 into the hose 85 and ultimately into the pressurization tank 35. Thus, the only components entering the pressurization tank 35 of the slurry recovery apparatus 15 may be concrete slurry with the absence of aggregates larger than the openings in the mesh of the wire box 65. Thus, any entrained rocks or other debris may be trapped by the mesh of the wire box 65.

Considering now the slurry recovery system shown generally at 15 in more detail and with continued reference to FIG. 2, the slurry recovery system 15 may include the container shown generally at 35 in the form of the pressurized tank 35 which may be sized and shaped to be mounted conventionally on board the cement mixer truck 45, as illustrated in FIG. 1. The slurry recovery system 15 may further include a slurry inlet 75 in a wall 70 of the tank 35 and a slurry inlet valve 80 adapted to receive an end of the hose 85. The slurry inlet valve 80 serves to control the flow of concrete slurry from the hose 85 and to seal the pressurization tank 35 when the contents of the container 35 are discharged back into the drum 50 of the truck 45. The slurry inlet valve 80 may be of a conventional type as is well known in the art and preferably would be a quick release type where the valve 80 may automatically seal when the hose 85 is disconnected therefrom.

With continued reference to FIG. 2, an air inlet valve (not shown) may control the flow of air under pressure into the pressurization tank 70 from a source of air pressure (not shown) through an air regulator 95, a T junction indicated at 100, and an air supply line 105, which may be connected in fluid communication with an air inlet (not shown) to the pressurization tank 35. In an embodiment of the slurry recovery system 15 as illustrated in FIG. 2, the air inlet (not shown) may be located near the top of the pressurization tank 35, however, other positions are possible. The air pressure source (not shown) may be capable of supplying a predetermined level of air pressure and is preferably controlled by the air regulator 95. The level of air pressure within the pressurization tank 35 may be indicated to a operator by a pressure gauge 115 mounted on the tank at the T junction 100. In addition, an air inlet valve (not shown) may be provided to control the flow of air into the pressurization tank 35.

With continued reference to FIG. 2, a recovery discharge output pipe 120 may be connected in fluid communication with the pressurization tank 70 through an output valve 125. The recovery discharge output pipe 120 may extend from the pressurization tank 70 via the output valve 125 to a recovery reservoir such as, for example, the rotating drum 50 (FIG. 1) of the cement mixer truck 45 (FIG. 1), or a suitable recycling site (not shown).

The slurry recovery system shown generally at 15 may have other features and functions more fully described in U.S. Pat. No. 6,782,925.

Figure 13:
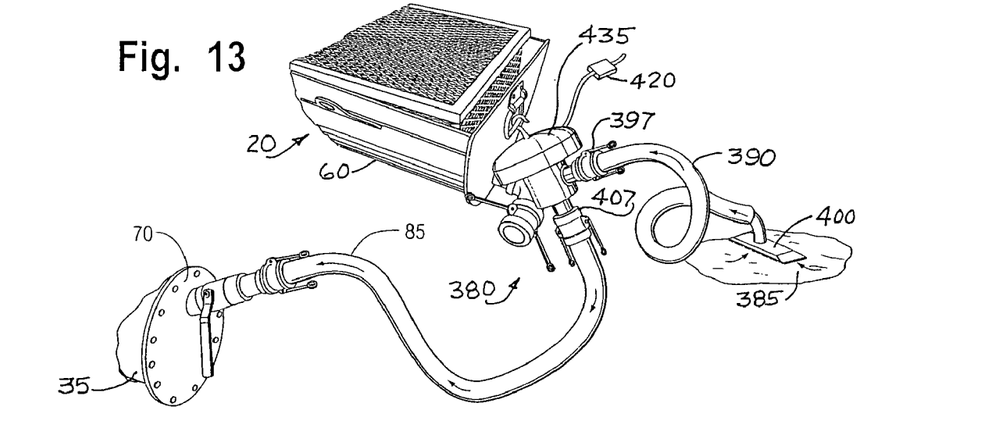
FIG. 13 is an enlarged scale fragmentary diagrammatic view of the system of FIG. 2, illustrating a suction tool in operation.

In another embodiment of the present invention and with reference to FIGS. 2 and 13, a suction tool shown generally at 380 may be provided to suction residual concrete slurry runoff 385 (FIG. 13) that may have inadvertently spilled onto the surrounding area of the cement truck 45 (FIG. 1). The system and method regarding the suction tool 380 is fully described hereinbelow.

Figure 3:
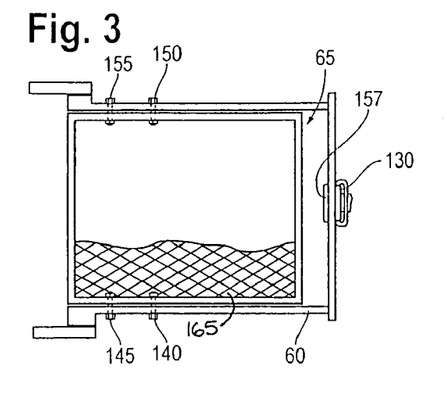
FIG. 3 is an enlarged fragmentary top plan view of a chute extension and wire box which forms part of the system of FIG. 2.

Considering now the collector 20 in even more detail with reference to FIGS. 2 and 3, the chute extension 60 may include an outlet 130 which may be connected in fluid communication with the cavity of the chute extension 60. The outlet 130 may be adapted to receive and to be coupled in fluid communication with the elbow 135 (FIG. 2). Furthermore, a filter screen 157 (FIG. 3) may be disposed over the input end of the threaded outlet for providing an additional level of filtering before the concrete slurry runoff enters the outlet 130.

Figures 5, 7A:
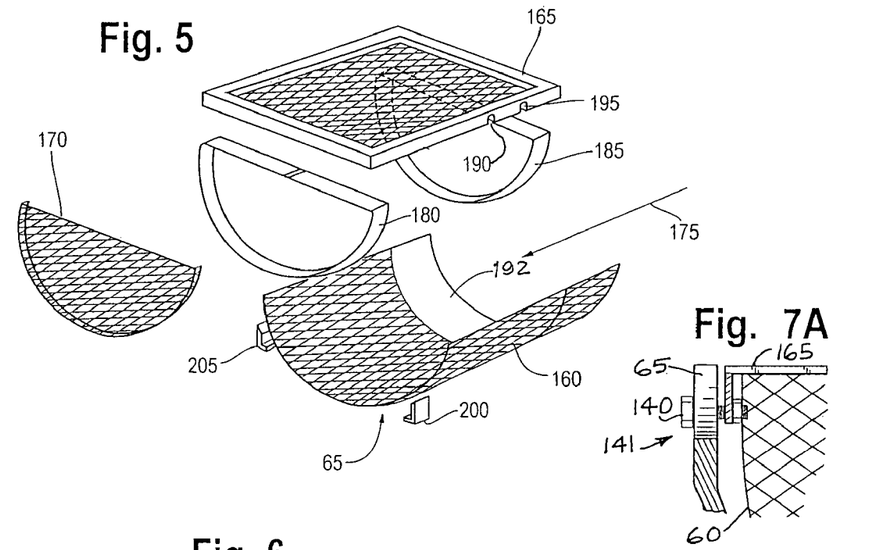
FIG. 5 is an exploded pictorial view of the wire box of FIG. 4.
FIG. 7A is a greatly enlarged detail fragmentary view of the wire basket securing arrangement of FIG. 2.

With continued reference to FIG. 3, within the cavity of the chute extension 60, there may be provided a plurality of fastening devices, such as bolts and nuts 140, 145, 150, and 155, for securing the wire box 65 (FIGS. 2 and 3) within the cavity of the chute extension 60. The fastening devices, such as the device 140, may releaseably fix the wire box 65 within the chute extension 60 as best seen in FIG. 7A. The fastening devices constitute a wire box supporting or fastening system shown generally at 141 in FIG. 7A.

Figure 4:
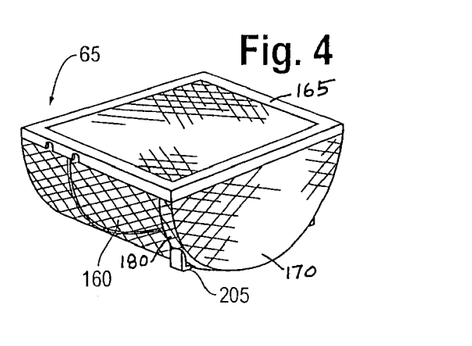
FIG. 4 is a pictorial view of the wire box which forms part of the system of FIG. 2.

Considering now the wire box 65 in more detail and with reference to FIGS. 4 and 5, the wire box 65 may be formed of metal, plastic or other suitable rigid material and may include a curved trough-shaped bottom surface 160 (FIG. 4) which may be formed of a mesh material. The bottom surface 160 may have a trough like cross-section and may be complementary shaped relative to the shape of the chute extension 60.

The wire box 65 may further include a rear mesh filter wall 170 (FIG. 4) formed of a mesh material for filtering out aggregates from the concrete slurry passing therethrough and emanating from the discharge end of the chute 25 (FIG. 2). The opposite end of the wire box 65 may be open so that the concrete slurry may enter the wire box 65 in the direction shown by arrow 175 (i.e., the entrance end) (FIG. 5) as the concrete slurry flows down the chute 25 (FIG. 2). Thus, in operation, the open end of the wire box 65 may be positioned upstream wherein the open end of the wire box 65 may be disposed proximate to the discharge end of the chute 25 (FIG. 2) when the wire box 65 is disposed within the chute extension 60 (FIG. 2).

With continued reference to FIG. 4, the wire box 65 may further include a generally flat, rectangular top mesh filter panel 165 which may also be formed of a mesh material. The filter panel 165 may serve to admit water or another suitable liquid into the wire box 65 to clean the aggregate trapped or captured therein for subsequent use.

Figure 7:
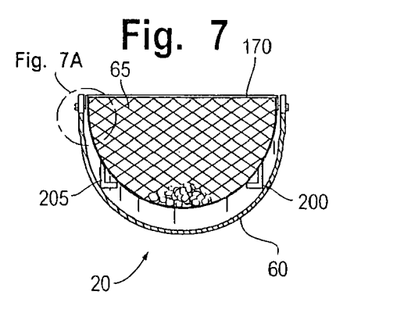
FIG. 7 is a diagrammatic cross-sectional front elevational view of a collector of FIG. 6 taken substantially along line 7-7 of FIG. 6.
Figure 8:
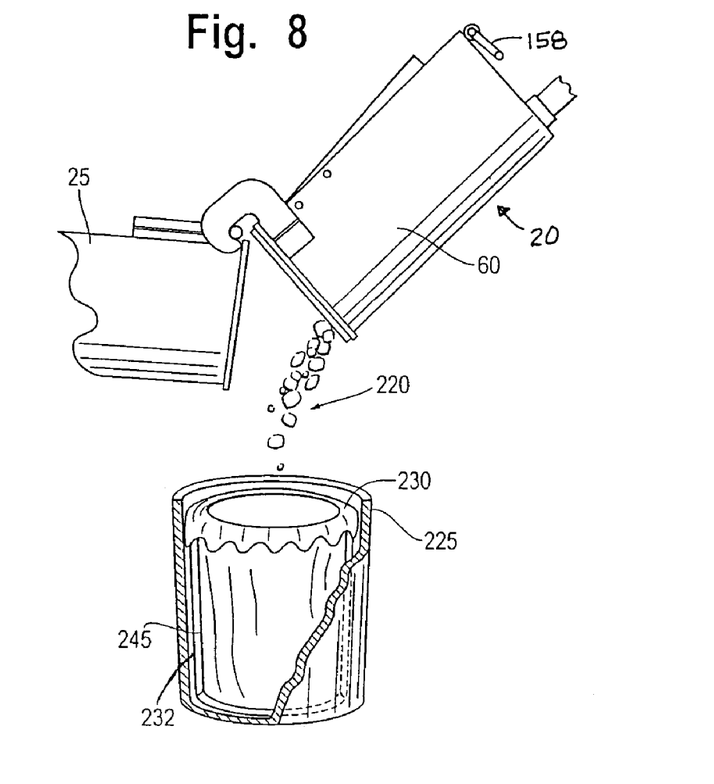
FIG. 8 is a fragmentary pictorial view of the system of FIG. 2, illustrating it in the process of removing aggregate material.

With reference to FIGS. 5, 7, and 8, a pair of "D" shaped bands or supports 180 and 185 may be provided to lend structural support for the wire box 65. The wire box 65 may further include a C band 192 disposed on the inner surface of the bottom through shaped mesh surface 160 for providing additional structural support to the wire box 65.

In addition, the wire box 65 may further include a pair of wire box flanges or feet 200 and 205 extending from the bottom surface 160 proximate to the rear D shaped mesh filter panel 170 for supporting the wire box 65 within the chute extension 60 (FIG. 6) at a slight angle relative to the axis of the chute extension 60 (FIGS. 2 and 6) where the top mesh filter panel 165 of the wire box 65 may be positioned with its rear end positioned slightly above the top surface of the chute extension 60 proximate to the discharge end of the chute extension 60. By having the wire box 65 disposed at a slight incline relative to the chute extension 60 (FIGS. 6 and 7), the flow of concrete slurry may be facilitated through the chute extension 60 to help wash any captured aggregate 220 contained within the wire box 65.

Considering now the collector 20 with reference to FIG. 7, the collector 20 may receive the wire box 65 therein supported at its rear end by the feet 200 and 205. The feet 200 and 205 are mounted off center from the bottom midpoint of the wire box 65 such that when the wire box 65 is placed within the cavity of the chute extension 60, the feet 200 and 205 abut the inner surface of the trough shaped wall of the chute extension 60 to slightly elevate the rear end of the box 65 within the extension 60.

Figure 6:
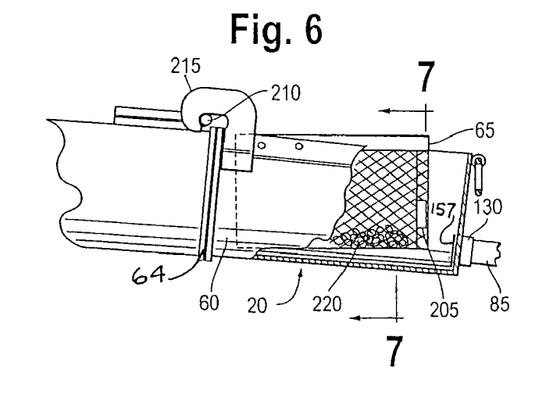
FIG. 6 is an enlarged fragmentary side elevational view of the system of FIG. 2.

With reference to FIG. 6, a gasket 64 may be disposed between the chute 25 and the chute extension 60 for helping to prevent leaks between the abutting portions thereof. The gasket may be formed of a conventional sealant material such as rubber. Reducing the amount of concrete slurry that exits portions of the chute extension 60 other than the hose 85 (FIG. 2), is desirable since concrete slurry may be an environmental hazard.

With reference to FIG. 8, the wire box securing system 141 secures the box 60 within the extension 65 so that the wire box 65 may not inadvertently fall out of the chute extension 65 when the chute extension 60 is pivoted upwardly to empty the aggregate 220 therefrom.

Considering now the top mesh filter panel 165 reference to FIG. 5, the top mesh filter 165 may further include a plurality of wire box mounting holes or notches such as notches 190 and 195 formed around the peripheral edge of the top mesh filter panel 165. The wire box mounting notches may be sized to releasably engage or, preferably, fit over the fastening devices such as the device 140 (FIG. 3) and may be supported thereon when the wire box 65 may be disposed within the cavity of the chute extension 60 (FIG. 3). The fastening devices 140, 145, 150, and 155 may fasten the wire box 65 and may be sealed to the extension 60.

In operation, when the wire box 65 is placed within the cavity of the chute extension 60 and fastened in place by the fastening devices, the closed end of the wire box 65 may be spaced from the discharge end of the chute extension 60 at the outlet 130. Thus, when concrete slurry passes through the box 65, the possibility of the concrete slurry splashing or otherwise exiting through the top of the chute extension 60 may be reduced or entirely eliminated.

Considering now the chute extension 60 in even more detail with reference to FIG. 6, the chute 25 may have a pair of pivot pins such as pin 210 attached thereto for pivotally engaging a pair of hooks, such as hook 215 extending from the chute extension 60 opposite the discharge end thereof. This pivotal arrangement may permit the chute extension 60 to pivot or swing upwardly relative to the chute 25 as best shown in FIG. 8.

Considering now the slurry capture system 10, with reference to FIG. 8, the chute extension 60 may be pivoted upwardly via a handle 158 or by merely grasping the body of the extension 60 so that the aggregate 220 previously filtered from the concrete slurry and stored within the wire box 65 may fall, via the force of gravity, through the open end of the wire box 65 into a container 225 such as a conventional five-gallon bucket. The container 225 may be placed directly below the chute extension 60 so that the aggregate 220 falling therefrom may be collected therein. The container 225 may have a bag 230 supported with its open mouth facing upwardly by a bag holder 232. Thus, the particulates or aggregate 220 may be received and stored within the bag 230. Both the bag 230 and the bag holder 232 may both be contained within the container 225.

The bag 230 may be formed of a plastic or other material, and may be a recyclable material. Thus, the bag 230 containing particulates 220 may form a recyclable component which may be taken to a recycle center and subsequently processed. Alternatively, the cleaned aggregate stored within the bag may be used to either fill other bags (not shown), or remain in the collection bag 230, to serve the same purpose as conventional sand bags (not shown). Using rocks instead of sand may be preferable since sand may constitute an environmental hazard in certain circumstances.

Figure 9:
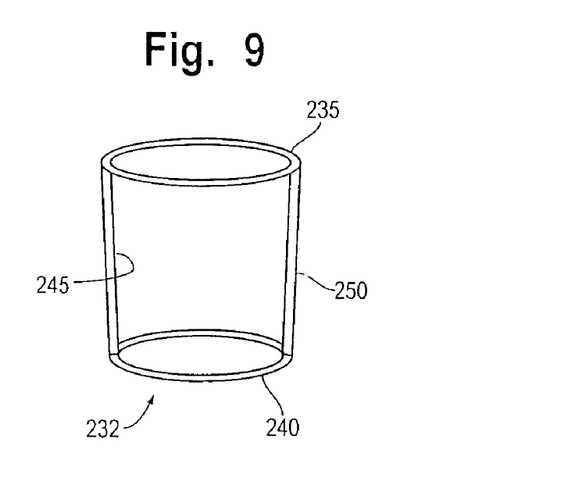
FIG. 9 is a pictorial view of a bag holder which forms a part of the system of FIG. 2.

Considering now the bag holder 232 in more detail and with reference to FIG. 9, the bag holder 232 may be formed of a flexible wire or other material. The holder 232 may be an open frame in the general shape of the container 225. The holder 232 may include an upper wire loop 235, a lower wire loop 240, joined by generally parallel wires or struts such as struts 245 and 250. Preferably, the bag holder 232 may be flexible so that it may deform to accommodate the mass of the bag 230 when the bag 230 may be filled with aggregate 220.

In operation, the operator may tuck the top or mouth of the bag 230 between the inner wall of the container 225 and the upper wire loop 235 (FIG. 9) to ensure that the mouth of the bag 230 remains open so as to not impede the reception of aggregate 220 falling from the wire box 65. After all or nearly all of the particulates 220 from the wire box 65 have discharged into the bag 230, the operator grasps the mouth of the bag 230 to lift the bag from the container 225 and the holder, which may be used again with another bag (not shown).

In an embodiment of the present invention, the operator may spray water or another cleaning liquid through the top mesh filter panel 165 (FIG. 5) to clean the filtered aggregate 220 stored in the wire box 65. In this way, the particulates 220 may become cleaned and usable for other uses such as a component for sand bag replacement devices before discharging into the container 225.

Figure 10:
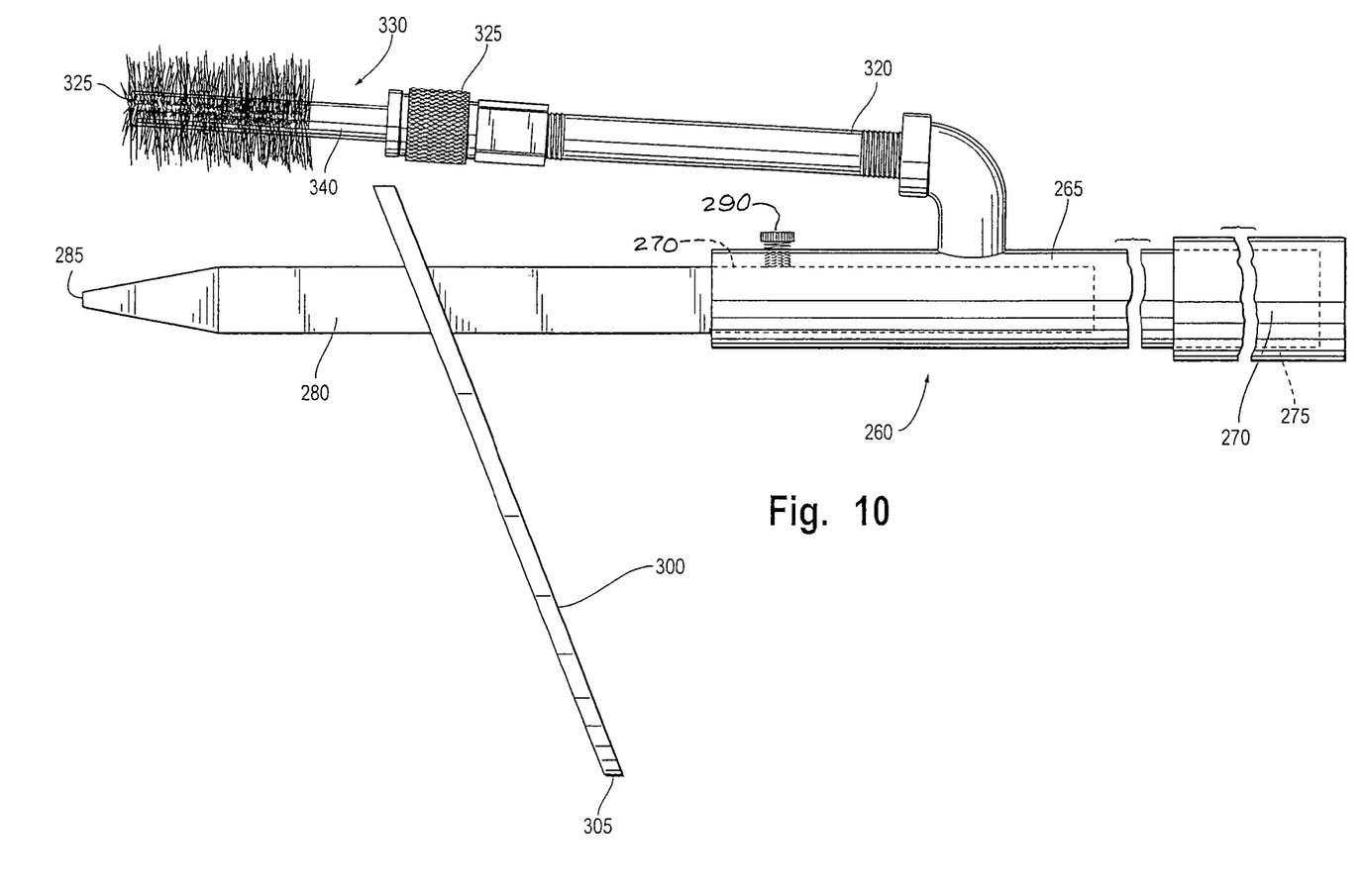
FIG. 10 is a side elevational view of a chute scraper tool which forms part of the system of FIG. 2.
Figure 11:
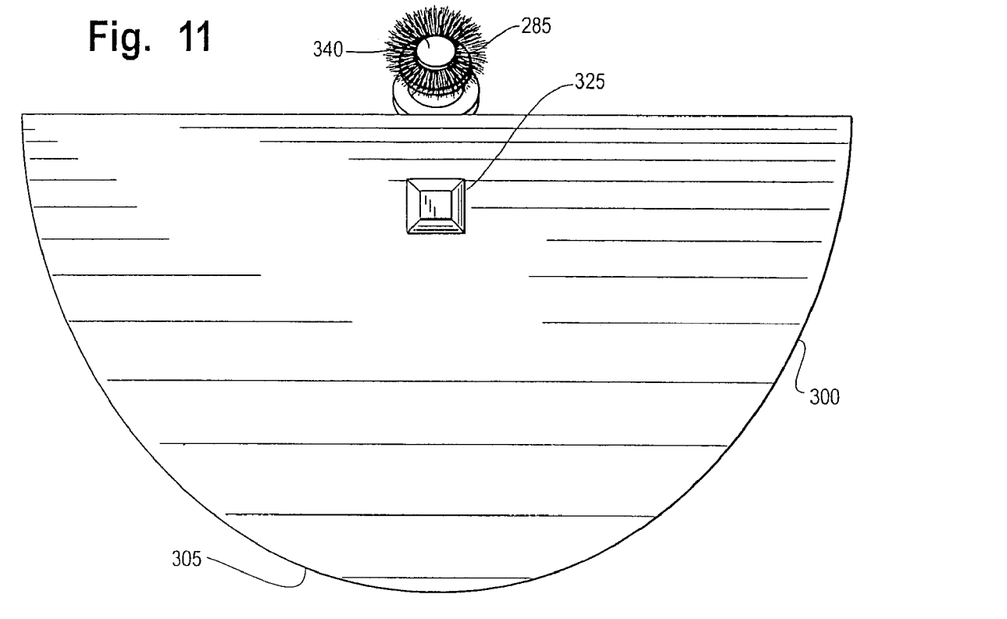
FIG. 11 is a front elevational view of the chute scraper tool of FIG. 10.

With reference to FIGS. 2 and 10, a chute scraper tool 260 may be provided for assisting the operator in removing residual concrete aggregate on the chute 25 (FIG. 2). The tool 260 may include an elongated rod 265 (FIG. 10) having a hand grip 270 formed at an end 275.

An elongated rod 280 may be releasably fixed within a bore 270 at the front end thereof and secured in place by a set screw 290. The rod 280 may contain a point 285 at the front end thereof for facilitating the breaking up of hardened residual concrete and aggregates on the chute 25.

The tool 260 may further include a chute scraper element 300, which may be formed of a rigid metallic material having a rounded bottom edge portion 305 (FIG. 12) which may be complementary shaped to the generally trough shape of the chute 25. The chute scraper element 300 may be fixed to the rod 285 via a weld (not shown) or other affixing methods as is well known in the art.

In order to facilitate the operator in scraping residue from the chute 25, the plane of the chute scraper element 300 may be angled towards the grip 270 to provide a suitable angle between the chute scraper element 300 and the chute 25 for scraping the hardened residual concrete and aggregates therefrom in a similar manner as a garden hoe.

In operation and with reference to FIGS. 2 and 10, the chute scraper tool 260 may be gripped by the hands of a operator, and may then be used by the operator to break up concrete hardened on the chute 25 using the point 285. After the concrete is broken up, the chute scraper element 300 of the chute scraper tool 260 may be placed within the chute 25 and pulled in a downwardly direction by the operator so that residue within the chute 25 may be pulled downwardly into the chute extension 60. After this operation is complete, the operator may then spray liquid 26 from a hose 27 to wash out the chute 25.

The chute scraper tool 260 may further include an attachment arm 320 extending forwardly from, and generally parallel to, the first elongated rod 265. A brush tool shown generally at 330 having an elongated rod or shank 340 may be releasably attached to the quick release mechanism or system 325 at a front end of the arm 320. The brush tool 330 may include a plurality of bristles shown generally at 325 (FIG. 10) at one end of the elongated rod 340. The opposite end of the elongated rod 340 may include a detent (not shown) for facilitating releasable attachment to the quick release system 325, as is well known in the art.

In operation, the operator may attach the brush tool 330 to the quick release mechanism 325 of the chute scraper tool 260 to facilitate cleaning of residue disposed on the chute 25. The tool 330 would be rotated axially from the position shown in FIG. 2 so that the brush attachment can engage the inner surface of the chute.

Figure 12:
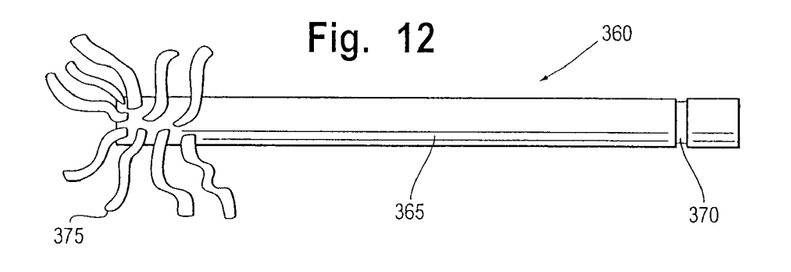
FIG. 12 is a side elevational view of an optional mop tool of the chute scraper tool of FIG. 10.

With reference to FIG. 12, an additional accessory tool in the form of a mop tool 360 may be provided as another attachment and may be similar in construction to the brush tool 330. The tool 360 has an elongated rod 365 having a detent 370 incorporated therein for attaching to the quick release mechanism 325. A plurality of fabric portions or strips such as fabric portion 375 may be provided on the opposite end of the elongated rod 365 thereby forming a mop. The operator may clean excess liquid from the chute 25 or from the ground near the cement mixing truck 45 (FIG. 1) in case of spillage.

With reference to FIG. 13, a suction tool shown generally at 380 may also be provided as part of a kit with the other portions of the system 10. The suction tool 380 may be releasably attached to the handle 158 or other convenient support surface by an operator, or the tool 380 may be fixed to the tank 15, or on the truck 45. The suction tool 380 may be used to suction residual concrete slurry runoff 385 that may have inadvertently spilled onto the surrounding area of the cement truck 45 (FIG. 1).

The suction tool 380 includes a suction hose 390, and may be attached to the suction inlet 395 of the suction tool 380 via quick disconnect hose coupling 397. The other side of the suction hose 390 may be connected to an attachment 400 adapted to receive, via suction, residual concrete slurry runoff 385 from the ground. A vacuum pump assembly 435 produces the required suction.

The suction tool 380 may further include an outlet 405 attached to the hose 85 via a quick disconnect hose coupling 407, or directly to the inlet 75 to the tank 15, or other container (not shown). In this embodiment of the present invention, the hose 85 now serves as a drain line so that concrete slurry runoff 385 suctioned by the suction tool 380 may drain under the force of gravity into the tank 70.

One end of the hose 85 may be de-attached from the quick disconnect hose coupling 32 of the chute extension 60 at the elbow 135 as best shown in FIG. 2, and re-connected onto the quick disconnect hose coupling 407 at the outlet 405 of the suction tool 380 so that runoff 385 may be removed from the ground and suctioned into the pressurization tank 35 and subsequently recycled as described heretofore. The coupling 32 may include an internal shut off valve (not shown) which closes automatically when the hose end is removed, and opens when it is inserted.

The suction tool 380 may further include a power cord 415 for attachment to a power conditioning circuit 420 so that the tool 380 can be energized by the battery of the vehicle 45. Alternatively, the suction tool may be powered by an AC power source.

The suction tool 380 may further include a hook 425 on the vacuum assembly 435 as best shown in FIG. 2, for releasably attaching the suction tool 380 onto the handle 158 or other suitable attachment point of the system 10.

In operation, the operator may place the suction tool 380 onto the handle 158 after residual concrete slurry runoff 385 may have spilled onto the ground surrounding the cement mixer truck 45. In order to remove the runoff 385 from the ground and recycle it, the hose 85 may be disconnected from the quick disconnect hose coupling 32 and re-attached onto the quick disconnect hose coupling 407. The suction tool 380 may then be energized via the power cord 415 so that the suction tool 380 may begin to create suction within the suction hose 390. In this way, the attachment 400 connected to one end of the suction hose 390 may begin to draw runoff 385 from the ground and into the suction hose 390 where it then flows through the suction tool 380 and discharges through the outlet 405 and into the hose 85 for discharge into the pressurization tank 35 where it is subsequently recycled as described heretofore. When the suction tool 380 is no longer required, the suction tool 380 may be released from the handle 158 and stored on the cement mixer truck 45.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A concrete recovery system for recovering concrete from a chute of a cement mixer, comprising:
    a collector having an attachment means for attaching to the chute and for collecting a residue therefrom;
    a chute extension pivotally attached to the discharge end of the chute, wherein the chute extension may be subsequently pivoted upwardly to discharge particulates stored therein;
    a container for storing the collected residue;
    a conduit coupled in fluid communication between the collector and the container for transferring the residue collected in the collector to the container for subsequent concrete recovery;
    a bag holder;
    a bag supported via the bag holder;
    an additional container for housing the bag supported by the bag holder; and
    wherein particulates from the collector may be dispensed into the bag.

2. A system for recovering concrete as recited in claim 1, wherein the collector further comprises an outlet port in fluid communication with the conduit.

3. A system for recovering concrete as recited in claim 1, wherein the collector further comprises a shutoff valve.

4. A system for recovering concrete as recited in claim 1, wherein the container further comprises an inlet port in fluid communication with the conduit.

5. A system for recovering concrete as recited in claim 1, further comprising a suction tool detachably connected in fluid communication with the container for suctioning residue from the ground.

6. A system for recovering concrete as recited in claim 1, further including a filter basket mounted within the chute extension for collecting particulates from the residue.

7. A system for recovering concrete as recited in claim 1, further comprising a concrete chute scraper for scraping excess residue from the chute.

8. A system for recovering concrete as recited in claim 1, further comprising a concrete fracturing device for fracturing hardened concrete in the chute.

9. A method of recovering concrete from a chute of a cement mixer, comprising:
   attaching a collector to the discharge end of the chute;
   pivotally attaching a chute extension to the discharge end of the chute wherein the chute extension may be pivoted to discharge particulates stored therein;
   attaching a conduit between the collector and a container;
   washing the chute with a liquid to form a concrete slurry;
   wherein the concrete slurry exits the discharge end of the chute and flows through the conduit into the collector;
   further supporting a bag via a bag holder and disposing the bag holder into another container; and dispensing the particulates from the collector into the bag.

10. A method of recovering concrete as recited in claim 9, further comprising suctioning concrete slurry from the ground into the collector.

11. A method of recovering concrete as recited in claim 9, further comprising removably attaching a filter basket within the chute extension for collecting particulates therein.

\* \* \* \* \*